United States Patent [19]
Kauth et al.

[11] Patent Number: 5,373,082
[45] Date of Patent: Dec. 13, 1994

[54] PROCESS FOR THE PRODUCTION OF THERMOPLASTIC POLYCARBONATES

[75] Inventors: Hermann Kauth; Steffen Kühling; Wolfgang Alewelt; Dieter Freitag, all of Krefeld, Germany

[73] Assignee: Bayer Aktiengesellschaft, Leverkusen, Germany

[21] Appl. No.: 155,309

[22] Filed: Nov. 19, 1993

[30] Foreign Application Priority Data

Dec. 1, 1992 [DE] Germany .............................. 4240314

[51] Int. Cl.$^5$ ............................................. C08G 64/00
[52] U.S. Cl. ............................................ 528/196; 528/199
[58] Field of Search ................................ 528/196, 199

[56] References Cited

U.S. PATENT DOCUMENTS

| | | | |
|---|---|---|---|
| 4,346,211 | 8/1982 | Krishnan et al. | 528/173 |
| 4,727,134 | 2/1988 | Brunelle et al. | 528/371 |
| 5,151,452 | 9/1992 | Fennhoff et al. | 521/48 |
| 5,189,139 | 2/1993 | Tuinstra et al. | 528/196 |
| 5,266,716 | 11/1993 | Buysch et al. | 558/260 |

FOREIGN PATENT DOCUMENTS

| | | |
|---|---|---|
| 4141954 | 6/1993 | Germany . |
| 4220412 | 1/1994 | Germany . |
| 4238123 | 5/1994 | Germany . |

*Primary Examiner*—John Kight, II
*Assistant Examiner*—Terressa Mosley
*Attorney, Agent, or Firm*—Joseph C. Gil; Aron Preis

[57] ABSTRACT

A process for the production of polycarbonates by melt transesterification is disclosed. Accordingly, polycarbonate waste is dissolved in monophenols and at an elevated temperature and in the presence of a catalyst degraded to yield oligocarbonates, diaryl carbonates and diphenols. Following the optional separation of fillers and other additives there is produced by partial recondensation and the distillation of monophenol a higher viscosity oligocarbonate having a OH and aryl carbonate terminal groups and a weight average molecular weight of 8000 to 18000, the oligocarbonate thus produced is then polycondensed to form a polycarbonate resin.

5 Claims, No Drawings

PROCESS FOR THE PRODUCTION OF THERMOPLASTIC POLYCARBONATES

FIELD OF THE INVENTION

The invention relates to polycarbonate resins and in particular to the recycling of waste polycarbonate resin.

SUMMARY OF THE INVENTION

A process for the production of polycarbonates by melt transesterification is disclosed. Accordingly, polycarbonate waste is dissolved in monophenols and at an elevated temperature and in the presence of a catalyst degraded to yield oligocarbonates, diaryl carbonates and diphenols. Following the optional separation of fillers and other additives, there is produced by partial recondensation and the distillation of monophenol a higher viscosity oligocarbonate having a weight average molecular weight of 8000 to 18000, the oligocarbonate thus produced is then polycondensed to form a polycarbonate resin.

DETAILED DESCRIPTION OF THE INVENTION

The present invention provides a process for the production of polycarbonates by melt transesterification which is characterized in that
1. polycarbonate resin made from diphenols of the formula (I),

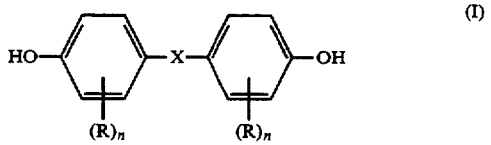

in which
X is $C_1$–$C_8$ alkylidene, $C_5$–$C_{12}$ cycloalkylidene, S or a single bond, and
R is $CH_3$, Cl or Br, and
n is zero, 1 or 2,
is dissolved in monophenols and degraded at temperatures of 100° C. to 295° C., preferably from 150° C. to 250° C., and in the presence of quaternary ammonium compounds or quaternary phosphonium compounds as catalysts into a mixture of oligocarbonates, diaryl carbonates and diphenols, and
2. after the optional separation of fillers and/or other additives by filtration, centrifugation, sedimentation or adsorptive processes, there is produced by partial recondensation of the degradation product and while monophenol is distilled off at temperatures from 180° C. to 260° C. and pressures between atmospheric pressure and 2 mbar, optionally with the addition or diaryl carbonate, a higher viscosity oligocarbonate having an average molecular weight of 8000 to 18000 and OH and aryl carbonate terminal groups where the ratio OH/aryl carbonate terminal groups is 25-50%/75-50%, preferably 30-45%/70-55%, and
3. polycondensing the higher viscosity oligocarbonate, optionally, in the presence of further catalyst, at temperatures between 250° C. and 295° C. and pressures from <500 mbar to 0.01 mbar into polycarbonates having a weight average molecular weights ($M_w$) between approx. 20000 and 100000, preferably between 22000 and 60000 as determined in a known manner by measuring the relative solution viscosity in $CH_2Cl_2$ or in mixtures of equal quantities by weight of phenol/o-dichlorobenzene, wherein calibration is performed beforehand by light scattering.

The advantage of the process according to the invention is primarily that polycarbonate waste may be used as starting material. The purpose of the process according to the invention is, therefore, preferably to reprocess polycarbonate waste, wherein undesired additives, fillers etc. may be separated by filtration, centrifugation, sedimentation or adsorptive processes.

The polycarbonates obtained in accordance with the invention are of good quality; in particular, they are solvent-free, low-branching or are purposefully branched and have a light inherent color.

BACKGROUND OF THE INVENTION

German Patent Applications P 4141954.5 and P 42202412.7 disclose the degradation of polycarbonates with monohydroxy compounds, wherein in both cases the aim is completely to decompose the polycarbonates into bisphenol structural units, naturally with the aim of re-use for new polycarbonate syntheses, optionally, by direct condensation. In contrast, the process according to the present invention proceeds, in terms of the degradation stage, only as far as the oligocarbonate stage and re-builds these into high molecular weight polycarbonates in accordance with a special polycondensation process.

Polycondensation of oligocarbonate has been disclosed in the commonly assigned German Patent Application P 4238123.1.

The process of the present invention is neither described in the prior art nor rendered obvious by it.

Solvent-free pursuant to the process according to the invention means that halogenated hydrocarbons, ketones and hydrocarbons are not used in the degradation and re-synthesis of the polycarbonate.

Low-branching pursuant to the process according to the invention means that the content of branching agents of the formula (II)

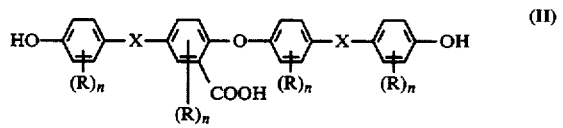

with
X=$C_1$–$C_8$ alkylidene or $C_5$–$C_{12}$ cycloalkylidene, —S—, or a single bond,
R=$CH_3$, Cl or Br, and
n=0, 1 or 2
in the re-synthesized polycarbonate does not exceed a value of 75 ppm after complete saponification and HPLC determination.

Suitable monophenols for the process according to the invention include in :particular low-boiling phenols, such as, phenol itself, cresols, chlorophenols, xylenols, isopropylphenols and p-tert.-butylphenol, preferably phenol and cresols, particularly preferably phenol.

The molar ratio of starting polycarbonate (as molar weight unit) to monophenol is between 1:1 to 1:20, preferably 1:1.5 to 1:10.

The temperatures for cleavage of the starting polycarbonates with the monophenols are between 100° C. and 295° C., preferably between 150° C. and 250° C. The process is optionally performed at pressures above atmospheric in order to keep the monophenol in the liquid phase.

The catalysts are used in the process according to the invention in concentrations of $10^{-8}$ to $10^{-1}$ tool related to 1 mol of polycarbonate units, preferably in a concentration of $10^{-7}$ to $10^{-2}$ tool.

Preferred catalysts are those of the formulae (III) and (IV)

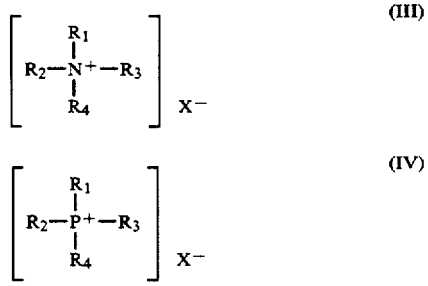

wherein $R_{1-4}$ may independently be $C_1-C_{18}$ alkyls, $C_6-C_{10}$ aryls or $C_5-C_6$ cycloalkyls and $X^-$ denotes an anion for which the corresponding acid-base pair $H^+ + X^- \longleftrightarrow HX$ has a $pK_B$ of $<11$.

Catalysts pursuant to the process according to the invention are, for example: tetramethylammonium hydroxide, tetramethylammonium acetate, tetramethylammonium fluoride, tetramethylammonium tetraphenylborate, tetraphenylphosphonium fluoride, tetraphenylphosphonium tetraphenylborate, dimethyldiphenylammonium hydroxide, tetraethylammonium hydroxide.

A mixture of catalysts may also be used.

Polycarbonates which are recycled pursuant to the process according to the invention include homopolycarbonates and copolycarbonates made from the diphenols of the formula (I) and mixtures thereof, wherein preferred diphenols of the formula (I) include: 4,4-dihydroxydiphenyl, 4,4'-dihydroxydiphenyl sulphide, 1,1-bis-(4-hydroxyphenyl)cyclohexane, bis-(4-hydroxyphenyl)methane, 2,2-bis-(4-hydroxyphenyl)propane, 2,4-bis-(4-hydroxyphenyl)-2-methylbutane, 2,2-bis-(3-methyl-4-hydroxyphenyl)propane, 2,2-bis-(3-chloro-4-hydroxyphenyl)propane, bis-(3,5-dimethyl-4-hydroxyphenyl)methane, 2,2-bis-3,5-dimethyl-4-hydroxyphenyl)propane, 2,4-bis-(3,5-dimethyl-4-hydroxyphenyl)-2-methylbutane, 2,2-bis-(3,5-dichloro-4hydroxyphenyl)propane, 2,2-bis-(3,5-dibromo-4- hydroxyphenyl)propane and 1,1-bis-(4-hydroxyphenyl)-3,3,5-trimethylcyclohexane.

Particularly preferred diphenols are 2,2-bis-(4-hydroxyphenyl)propane and 1,1-bis-(4,hydroxyphenyl)-3,3,5-trimethylcyclohexane.

The diaryl carbonates arising from cleavage of the polycarbonate result from the monophenols used for the cleavage and from the chain terminators used in the polycarbonates to be cleaved.

The diaryl carbonate which may optionally be added in the second stage is preferably a carbonic acid di-$C_6$-$C_{14}$-aryl ester. The preferred diaryl carbonate is in particular diphenyl carbonate.

It is to be ensured that the reaction components to be added, namely monophenols in the first stage and optionally carbonic acid diaryl esters in the second process stage are free of alkali and alkali-earth ions, wherein quantities of alkali or alkali-earth ions below 0.1 ppm may be tolerated. Monophenols or carbonic acid diaryl esters of such purity are obtainable by re-crystallizing, washing or distilling the carbonic acid diaryl esters or monophenols.

If the polycarbonate waste used as starting carbonates contain condensed branching agents, these are again incorporated on recondensation so that in this case branched polycarbonates are purposefully and deliberately obtained.

The process according to the invention is preferably performed in the following three stages:

In the first stage, degradation of the starting polycarbonate to the oligocarbonate takes place at temperatures of 100° C. to 295° C., preferably at temperatures of 150° C. to 250° C. In the second stage, monophenol is distilled off by applying a vacuum between atmospheric pressure and 2 mbar at temperatures between 180° C. and 260° C. and optionally with addition of further diaryl carbonate, preferably diphenyl carbonate. A high viscosity oligocarbonate is achieved with an $\overline{M}_w$ (weight average molecular weight determined by measuring the relative solution viscosity in $CH_2Cl_2$ or in mixtures of equal quantities by weight of phenol/o-dichlorobenzene, calibrated by light scattering) of between 8000 and 18000, and in the third stage polycondensing at temperatures between 250° C. and 295° C. and pressures from $<500$ mbarto 0.01 mbar to the low-branching polycarbonates with an between 20000 and 100000, preferably between 22000 and 60000, wherein the $\overline{M}_w$ is again determined as explained above for the oligocarbonates.

The OH terminal group content of the oligocarbonates obtained in tile second stage of the process according to the invention is defined as $$x \text{ mol } \% = \frac{\text{number of OH terminal groups}}{\text{total number of terminal groups}} \times 100$$

and amounts between 25% and 50%.

The OH/aryl carbonate terminal group ratio of these oligocarbonates was determined by separately determining the OH terminal groups by photometry with $TiCl_4$, and determining the aryl carbonate terminal groups by HPLC analysis of the monophenol formed after complete saponification. In these oligocarbonates, the OH terminal groups and aryl carbonate terminal groups generally together add up to 100%.

The process according to the invention may be performed both continuously and discontinuously, and namely in stirred-tank reactors, film evaporators, stirred-tank reactors in series, extruders, kneaders, simple disk reactors or high viscosity disk reactors.

The polycarbonates obtainable in accordance with the process according to the invention exhibit the normal OH terminal group contents known from the literature.

This is achieved by the low molecular weight oligocarbonates from the second stage preferably being condensed by monophenol distillation into low viscosity polycarbonates and the higher molecular weight oligocarbonates from the second stage being condensed into higher molecular weight polycarbonates.

The polycarbonates obtainable in accordance with the process according to the invention are isolated, for example, by discharging, spinning and pelletizing.

The low-branching or purposefully branched polycarbonates obtainable in accordance with the process according to the invention may have customary additives, stabilizers etc. incorporated into them in a known manner.

The polycarbonates obtainable in accordance with the process according to the invention may be processed in customary machines, for example, in extruders or injection molding machines, into any desired moldings, for example, film or sheet in a customary manner. These polycarbonate moldings may be used industrially in a known manner, for example, in electrical engineering.

The invention is further illustrated but is not intended to be limited by the following examples in which all parts and percentages are by weight unless otherwise specified.

EXAMPLES

COMPARATIVE EXAMPLE 1

127 g (0.5 mol) of bisphenol A based polycarbonate $\eta rel=1.298$, dichloromethane, 25° C., 5 g/l) and 188 g (2.0 mol) of phenol are weighed out into a 500 ml three-necked flask with stirrer, internal thermometer and Vigreux column (30 cm, metallized) with condenser.

Atmospheric oxygen is eliminated from the apparatus by applying a vacuum and flushing with nitrogen (3 times) and the mixture is heated to 180° C. Once the polycarbonate has dissolved, 0.001 mol % of sodium phenolate are added and the mixture stirred at this temperature for 60 minutes.

At this point, the degraded polycarbonate has a relative viscosity of $\eta rel=1.03$ (measured after precipitation in acetone). Apart from phenol and low molecular weight oligocarbonate, 14.4% of free bisphenol A and 14.3% of free diphenyl carbonate are also detected in the mixture produced.

3.21 g (0.015 mol = 3.0 mol % related to polycarbonate) of diphenyl carbonate are now added and the excess and liberated phenol is distilled off at 300 mbar. After 30 minutes, the temperature is increased to 250° C. After a further 60 minutes, the vacuum is increased to 10 mbar.

The intermediately formed oligocarbonate has an OH:aryl carbonate terminal group ratio of 31:69.

Polycondensation is achieved by increasing the vacuum to 0.5 mbar and raising the temperature to 280° C. A solvent-free polycarbonate is obtained with a relative solution viscosity of 1.325 (dichloromethane, 25° C., 5 g/l). The content of branching agent of the formula (I) in the polycarbonate produced is 320 ppm.

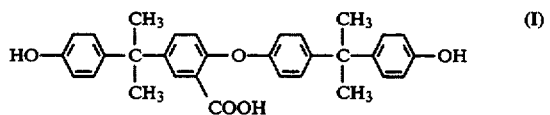

COMPARATIVE EXAMPLE 2

As Comparative Example 1, but the polycarbonate is degraded at 150° C., degradation time is 60 minutes. The degradation product has a relative viscosity of $\eta rel=1.05$ (measured after precipitation in acetone). Apart from phenol and low molecular weight oligocarbonate, 2.7% of free bisphenol A and 2.2% of free diphenyl carbonate are also detected in the mixture produced.

The intermediately formed oligocarbonate (250° C./10 mbar) has an OH:aryl carbonate terminal group ratio of 29:71. The polycondensation temperature is 275° C. A solvent-free polycarbonate is obtained with a relative solution viscosity of 1.287 (dichloromethane, 25° C., 5 g/l). The content of branching agent of the formula (I) in the polycarbonate produced is 250 ppm.

COMPARATIVE EXAMPLE 3

As Comparative Example 1, but 0.0039 g of $N(CH_3)_4B(C_6H_5)_4$ ($2\times10^{-3}$ mol %) is used as catalyst, the degradation temperature is 180 DC and the degradation time 60 minutes. The degradation product has a relative viscosity of $\eta rel=1.05$ (measured after precipitation in acetone). Apart from phenol and low molecular weight oligocarbonate, 7.0% of free bisphenol A and 7.8% of free diphenyl carbonate are also detected in the mixture produced.

The intermediately formed oligocarbonate (250° C./10 mbar) has an OH:aryl carbonate terminal group ratio of 38:62. The polycondensation temperature is 300° C. A solvent-free polycarbonate is obtained with a relative solution viscosity of 1.296 (dichloromethane, 25° C., 5 g/l). The content of branching agent of the formula (I) in the polycarbonate produced is 145 ppm.

COMPARATIVE EXAMPLE 4

As Comparative Example 1, but 0.0039 g of $N(CH_3)_4B(C_6H_5)_4$ ($2\times10^{-3}$ mol %) is used as catalyst, the degradation temperature is 150° C. and the degradation time 60 minutes. The degradation product has a relative viscosity of $\eta rel=1.06$ (measured after precipitation in acetone). Apart from phenol and low molecular weight oligocarbonate, 0.9% of free bisphenol A and 1.0% of free diphenyl carbonate are also detected in the mixture produced.

The intermediately formed oligocarbonate (250° C./10 mbar) has an OH:aryl carbonate terminal group ratio of 36:64. The polycondensation temperature it 310° C. A solvent-free polycarbonate is obtained with a relative solution viscosity of 1.313 (dichloromethane, 25° C., 5 g/l). The content of branching agent of the formula (I) in the polycarbonate produced is 265 ppm.

COMPARATIVE EXAMPLE 5

As Comparative Example 1, but 0.0039 g of $N(CH_3)_4B(C_6H_5)_4$ ($2\times10^{-3}$ mol %) is used as catalyst, the degradation temperature is 150° C. and the degradation time 30 minutes. The degradation product has a relative viscosity of $\eta rel=1.06$ (measured after precipitation in acetone). Apart from phenol and low molecular weight oligocarbonate, 1.1% of free bisphenol A and 1.0% of free diphenyl carbonate are also detected in the mixture produced.

The intermediately formed oligocarbonate (250° C./10 mbar) has an OH:aryl carbonate terminal group ratio of 33:67. The polycondensation temperature is 320° C. A solvent-free polycarbonate is obtained with a relative solution viscosity of 1.327 (dichloromethane, 25° C., 5 g/l). The content of branching agent of the formula (I) in the polycarbonate produced is 580 ppm.

COMPARATIVE EXAMPLE 6

As Comparative Example 1, but 0.0045 g of $N(CH_3)_4OH$ ($1\times10^{-2}$ mol %) in a 25% methanol solution, 0.0003 g of $NaHCO_3$ ($1\times10^{-2}$ mol %) in a 1% aqueous solution and 0.0039 g of $H_3BO_3$ are used as catalyst, the degradation temperature is 180° C. and the degradation time 30 minutes. The degradation product has a relative viscosity of $\eta rel=1.04$ (measured after precipitation in acetone). Apart from phenol and low molecular weight oligocarbonate, 12.3% of free bisphenol A and 12.6% of free diphenyl carbonate are also detected in the mixture produced.

The intermediately formed oligocarbonate (250° C./10 mbar) has an OH:aryl carbonate terminal group ratio of 32:68. The polycondensation temperature is 280° C. A solvent-free polycarbonate is obtained with a relative solution viscosity of 1.304 (dichloromethane, 25° C., 5 g/l). The content of branching agent of the formula (I) in the polycarbonate produced is 245 ppm.

COMPARATIVE EXAMPLE 7

As comparative example 1, but 0.0045 g of $N(CH_3)_4OH$ ($1 \times 10^{-2}$ mol %) and 0.0003 g of $NaNCO_3$ ($1 \times 10^{-2}$ mol %) in a 1% aqueous solution are used as catalyst, the degradation temperature is 150° C. and the degradation time 60 minutes. The degradation product has a relative viscosity of $\eta rel = 1.06$ (measured after precipitation in acetone). Apart from phenol and low molecular weight oligocarbonate, 3.5% of free bisphenol A and 3.2% of free diphenyl carbonate are also detected in the mixture produced.

The intermediately formed oligocarbonate (250° C./10 mbar) has an OH:aryl carbonate terminal group ratio of 40:60. The polycondensation temperature is 280° C. A light colored solvent-free polycarbonate is obtained with a relative solution viscosity of 1.275 (dichloromethane, 25° C., 5 g/l). The content of branching agent of the formula (I) in the polycarbonate produced is 290 ppm.

EXAMPLE 1

As Comparative Example 1, but 0.0039 g of $N(CH_3)_4B(C_6H_5)_4$ ($2 \times 10^{-3}$ mol %) is used as catalyst, the degradation temperature is 180° C. and the degradation time 60 minutes. The degradation product has a relative viscosity of $\eta rel = 1.04$ (measured after precipitation in acetone). Apart from phenol and low molecular weight oligocarbonate, 8.9% of free bisphenol A and 9.4% of free diphenyl carbonate are also detected in the mixture produced.

The intermediately formed oligocarbonate (250° C./10 mbar) has an OH:aryl carbonate terminal group ratio of 36:64. The polycondensation temperature is 280° C. A solvent-free polycarbonate is obtained with a relative solution viscosity of 1.252 (dichloromethane, 25° C., 5 g/l). The content of branching agent of the formula (I) in the polycarbonate produced is 15 ppm.

EXAMPLE 2

As Comparative Example 1, but 0.0009 g of $N(CH_3)_4OH$ ($2 \times 10^{-3}$ mol %) is used as catalyst, the degradation temperature is 180° C. and the degradation time 30 minutes. The degradation product has a relative viscosity of $\eta rel = 1.06$ (measured after precipitation in acetone). Apart from phenol and low molecular weight oligocarbonate, 7.2% of free bisphenol A and 7.5% of free diphenyl carbonate are also detected in the mixture produced.

The intermediately formed oligocarbonate (250° C./10 mbar) has an OH:aryl carbonate terminal group ratio of 38:62. The polycondensation temperature is 280° C. A solvent-free polycarbonate is obtained with a relative solution viscosity of 1.269 (dichloromethane, 25° C., 5 g/l). The content of branching agent of the formula (I) in the polycarbonate produced is 45 ppm.

EXAMPLE 3

As Comparative Example 1, but 0.0065 g of $PPh_4BPh_4$ ($2 \times 10^{-3}$ mol %) is used as catalyst, the degradation temperature is 180 DC and the degradation time 60 minutes. The degradation product has a relative viscosity of $\eta rel = 1.04$ (measured after precipitation in acetone). Apart from phenol and low molecular weight oligocarbonate, 11.4% of free bisphenol A and 11.8% of free diphenyl carbonate are also detected in the mixture produced.

The intermediately formed oligocarbonate (250° C./10 mbar) has an OH:aryl carbonate terminal group ratio of 37:63. The polycondensation temperature is 280° C. A solvent-free polycarbonate is obtained with a relative solution viscosity of 1.281 (dichloromethane, 25° C., 5 g/l). The content of branching agent of the formula (I) in the polycarbonate produced is 60 ppm.

EXAMPLE 4

As Comparative Example 1, but 0.0039 g of $PPh_4BPh_4$ ($2 \times 10^{-3}$ mol %) is used as catalyst, the degradation temperature is 150° C. and the degradation time 60 minutes. The degradation product has a relative viscosity of $\eta rel = 1.05$ (measured after precipitation in acetone). Apart from phenol and low molecular weight oligocarbonate, 0.9% of free bisphenol A and 1.2% of free diphenyl carbonate are also detected in the mixture produced.

The intermediately formed oligocarbonate (250° C./10 mbar) has an OH:aryl carbonate terminal group ratio of 37:63. The polycondensation temperature is 280° C. A solvent-free polycarbonate is obtained with a relative solution viscosity of 1.294 (dichloromethane, 25° C., 5 g/l). The content of branching agent of the formula (I) in the polycarbonate produced is 35 ppm.

EXAMPLE 5

As Comparative Example 1, but 0.0039 g of $N(CH_3)_4B(C_6H_5)_4$ ($2 \times 10^{-3}$ mol %) is used as catalyst, the degradation temperature is 150° C. and the degradation time 30 minutes. The degradation product has a relative viscosity of $\eta rel. = 1.05$ (measured after precipitation in acetone). Apart from phenol and low molecular weight oligocarbonate, 1.9% of free bisphenol A and 2.3% of free diphenyl carbonate are also detected in the mixture produced.

The intermediately formed oligocarbonate (250° C./10 mbar) has an OH:aryl carbonate terminal group ratio of 32:68. The polycondensation temperature is 280° C. A solvent-free polycarbonate is obtained with a relative solution viscosity of 1.247 (dichloromethane, 25° C., 5 g/l). The content of branching agent of the formula (I) in the polycarbonate produced is 15 ppm.

EXAMPLE 6

As Example 4, but 7.49 g (0.035 mol-7 mol % related to polycarbonate) of diphenyl carbonate are used instead of 3.21 g. The intermediately formed oligocarbonate (250° C./10 mbar) has an OH:aryl carbonate terminal group ratio of 19:81. The polycondensation temperature is 280° C. A solvent-free polycarbonate is obtained with a relative solution viscosity of 1.197 (dichloromethane, 25° C., 5 g/l). The content of branching agent of the formula (I) in the polycarbonate produced is 20 ppm.

EXAMPLE 7

As Example 4, but no diphenyl carbonate is used after the degradation reaction. The intermediately formed oligocarbonate (250° C./10 mbar) has an OH:aryl carbonate terminal group ratio of 70:30. The polycondensation temperature is 280° C. A solvent-free polycarbonate is obtained with a relative solution viscosity of 1.175 (dichloromethane, 25° C., 5 g/l). The content of branching agent of the formula (I) in the polycarbonate produced is 20 ppm.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing polycarbonates by melt transesterification, comprising
   (i) degrading a polycarbonate resin waste by dissolving the resin in monophenol and in the presence of a catalyst selected from the group consisting of quaternary ammonium compounds and quaternary phosphonium compounds and at temperatures of 100° C. to 295° C. to yield a mixture of oligocarbonates, diaryl carbonates and diphenols wherein said polycarbonate is based on at least one diphenol conforming to
   in which
   X is $C_1$-$C_8$ alkylidene, $C_5$-$C_{12}$ cycloalkylidene, S or a single bond, and
   R is $CH_3$, Cl or Br, and
   n is zero, 1 or 2,
   (ii) partially recondensing said oligocarbonates to yield a higher viscosity oligocarbonate having a weight average molecular weight between 8000 and 18000 and a ratio of OH/aryl carbonate terminal group of about 25-50%/75-50%, and
   (iii) polycondensing said higher viscosity oligocarbonate at temperatures between 250° C. and 295° C. and pressures from <500 mbar to 0.01 mbar to produce a polycarbonate resin having a weight average molecular weight of 20000 to 100000 said molecular weight being determined by measuring the relative solution viscosity in a 5 g/l solution in dichloromethane at 25° C.

2. Process according to claim 1, characterised that the polycarbonates obtained are low-branching, such that the content of branching agent of the structure (II)

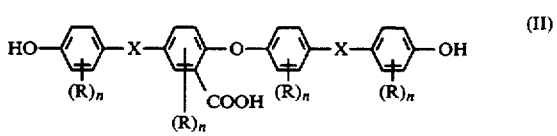

with X=$C_1$-$C_8$ alkylidene or $C_5$-$C_{12}$ cycloalkylidene, —S—, or a single bond, R=$CH_3$, Cl or Br and n=0, 1 or 2 in these polycarbonates does not exceed a value of 75 ppm after complete saponification and HPLC determination.

3. The process of claim 1 wherein said partially recondensing is carried out subsequent to separation of fillers and/or other additives.

4. The process of claim 1 wherein monophenol contains less than 0.1 ppm of alkali and/or alkali-earth ions.

5. The process of claim 1 wherein monophenol is free of alkali and/or alkali-earth ions.

* * * * *

UNITED STATES PATENT AND TRADEMARK OFFICE
CERTIFICATE OF CORRECTION

PATENT NO. : 5,373,082
DATED : December 13, 1994
INVENTOR(S) : Hermann Kauth et al It is certified that error appears in the above-indentified patent and that said Letters Patent is hereby corrected as shown below:

At column 3, line 4, delete "$10^{-1}$ tool" and insert --$10^{-1}$ mol--.
At column 3, line 6, delete "$10^{-2}$ tool" and insert --$10^{-2}$ mol--.
At column 4, line 33, delete "in tile second" and insert --in the second--.
At column 6, line 8, delete "10-3 mol%" and insert --$10^{-3}$ mol %--.
At column 6, line 9, delete "180 DC" and insert --180°C--.
At column 6, line 37, delete "temperature it" and insert --temperature is--.
At column 7, line 15, delete "NaN-" and insert --NaH- --.
At column 8, line 5, delete "180 DC" and insert --180°C--.

UNITED STATES PATENT AND TRADEMARK OFFICE
CERTIFICATE OF CORRECTION

PATENT NO. : 5,373,082
DATED : December 13, 1994
INVENTOR(S) : Hermann Kauth et al It is certified that error appears in the above-indentified patent and that said Letters Patent is hereby corrected as shown below:

In Claim 1, at column 9, line 29, after "diphenol conforming to", insert the formula:

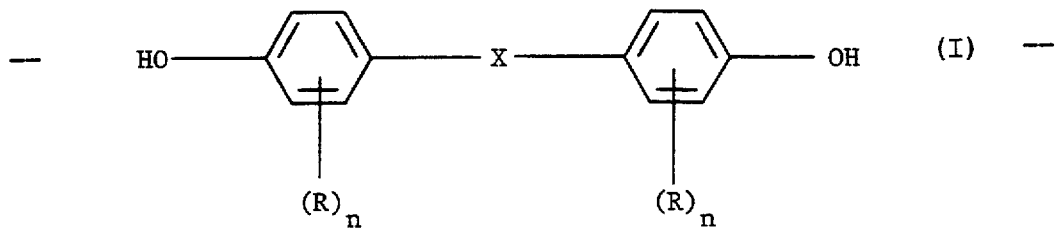

Signed and Sealed this

Nineteenth Day of March, 1996

*Attest:*

BRUCE LEHMAN

*Attesting Officer*   *Commissioner of Patents and Trademarks*